Oct. 20, 1925.

W. R. COLEMAN

1,557,659

ROTARY DUMP CONTROLLER

Filed Jan. 3, 1922  5 Sheets-Sheet 1

Fig. 1

Oct. 20, 1925.  
W. R. COLEMAN  
ROTARY DUMP CONTROLLER  
Filed Jan. 3, 1922

Inventor  
W. R. Coleman.

Oct. 20, 1925.

W. R. COLEMAN 1,557,659

ROTARY DUMP CONTROLLER

Filed Jan. 3, 1922  5 Sheets-Sheet 4

Inventor
W. R. Coleman.

By

Attorney

Patented Oct. 20, 1925.

1,557,659

UNITED STATES PATENT OFFICE.

WILLIAM R. COLEMAN, OF BIRMINGHAM, ALABAMA.

ROTARY-DUMP CONTROLLER.

Application filed January 3, 1922. Serial No. 526,848.

*To all whom it may concern:*

Be it known that I, WILLIAM R. COLEMAN, a citizen of the United States of America, residing at Birmingham, in the county of Jefferson and State of Alabama, have invented certain new and useful Improvements in Rotary-Dump Controllers, of which the following is a specification.

My invention relates to a dash-pot regulating means adapted to control the operation of a rotary dump.

My invention is more particularly, but not exclusively, concerned with cushioning the terminal movements of an automatic rotary dump which turns about its long axis and contemplates the use of one or more dash-pots to stop the dump without objectionable recoil.

The more important features of my present invention are, first, the novel, simple and effective means of transmitting motion from the dump to the dash-pot, such means involving in its preferred form a rack and pinion drive to transform the rotary movement of the dump to the rectilinear movement required for the operation of the dash-pot, such transmission being designed to produce the necessary speed reduction to insure a better action from the dash-pot and a more powerful effect on the dump; second, the adaptation of my controller mechanism to elongated rotary dumps adapted to receive a number of cars and dump them simultaneously, such adaptation involving the provision of means to make uniform the action of a plurality of dash-pots acting at different points along the dump; third, the strengthening of the elongated dash-pot controlled dump against torsional strains by mounting all dash-pot transmissions on a common shaft paralleling the dump and by its operative connections to the dump serving to prevent torsion; fourth, the provision of means to latch and unlatch an automatic rotary dump; and fifth, the provision of automatic and manual means for tripping the latch mechanism to release the dump for automatic operation. The dash pot structure shown in this application represents a particular adaptation of certain broadly novel features in the dash pot per se, which form the subject matter of a companion application, Serial No. 526,849, filed of even date herewith.

My invention further comprises the novel details of construction which are illustrated in their preferred embodiments only in the accompanying drawings, in which:—

Similar reference numerals refer to similar parts throughout the drawings.

I have illustrated my invention as applied to that type of rotary dump which comprises a frame work having a series of annular riding rings which rest upon trunnion wheels or like roller supports so that the dump is adapted to rotate about its long axis but in many respects the novel details of construction of my invention are adapted to other types of rolling or tilting dumps which require the cushion stop without recoil for their terminal movements which my dash-pot control mechanism will supply.

Figure 4:
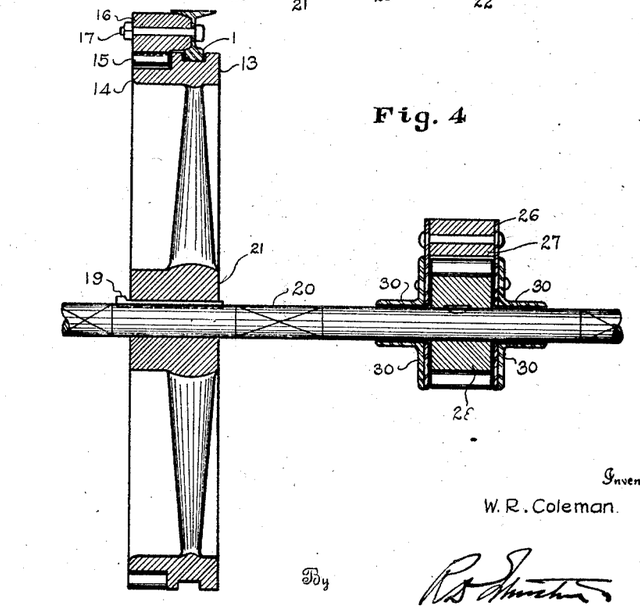
Fig. 4 is a vertical cross-sectional view through one of the trunnion rings of the dump and the rack and pinion drive therefor to the dash-pot.

In the embodiment of my invention illustrated, I show one end of a rotary dump comprising a series of annular riding rings 1 which are customarily formed of railroad rails bent into circular shape with their bases inturned and cross connected lengthwise of the dump by any suitable bracing or reinforcing frame work, that illustrated comprising a series of longitudinal top bars or plates 2 connecting the rings overhead, side plates 3 and a bottom plate 4, the latter carrying opposite each ring inclined angle iron braces 5 which at their upper ends are made fast to cross track supports 6 upon which the rails 7 forming a track for the mine cars to be dumped are mounted. These cross supports 6 carry on each side of the track longitudinal angle irons 8 disposed to overhang and engage suitable hold-down members 9 on the mine cars 10 to be dumped. The tracks 7 are shown set slightly off center so as to unbalance the dump for automatic rotation and I also provide the dump with a suitable counterweight 11 disposed below its center of gravity while in upright position and to the opposite side of a vertical center line from that towards which the car unbalances the dump. The car is so placed that when loaded its center of gravity is above the center line of the dump. As heretofore stated, it will be understood that the dump structure, as thus far described, is typical of any standard type of unbalanced rotary dump. The dump is supported by its riding rings resting upon trunnion wheels 12 and 13, the trunnion wheels 12 being of the simple type grooved to receive the head of the riding ring, while the trunnion wheels 13, as better seen in Fig. 4, are provided with an arcuate gear ring 14, either integral with or otherwise rigid with the trunnion wheel 13. As shown in Fig. 4, the gear ring 14 is cast integral with the trunnion and its teeth are adapted to mesh with the teeth 15 on a segmental rack 16 which is connected by bolts 17 to the side of the riding ring 1. This rack covers an arc slightly in excess of the maximum calculated arc of rotation for the dump. The trunnion wheels 12 are mounted on any suitable bearings 18 but the trunnion wheels 13 are preferably all made fast by keys 19 to a very strong stiff shaft 20 which is mounted to turn in bearings 21 set on the tipple frame 22, and this stiff shaft or its equivalent extends for the full length of the dump and thus connects rigidly all of the trunnion wheels 13 and will act through the geared connection from these wheels to the dump to resist torsion or twisting strains on the dump and make it much more rigid. The importance of this increases with the length of the dump and as my invention contemplates the dump being extended in length sufficient to receive, if desired, any ordinary train of mine cars, this will be an important factor in reducing the undue weight and cost of the dump which would result from the bracing and stiffening means otherwise required to counteract the torsion and twisting strains. However, the use of such a continuous shaft is optional as any suitable bearing may be used for the various dash-pot drives.

Figure 1:
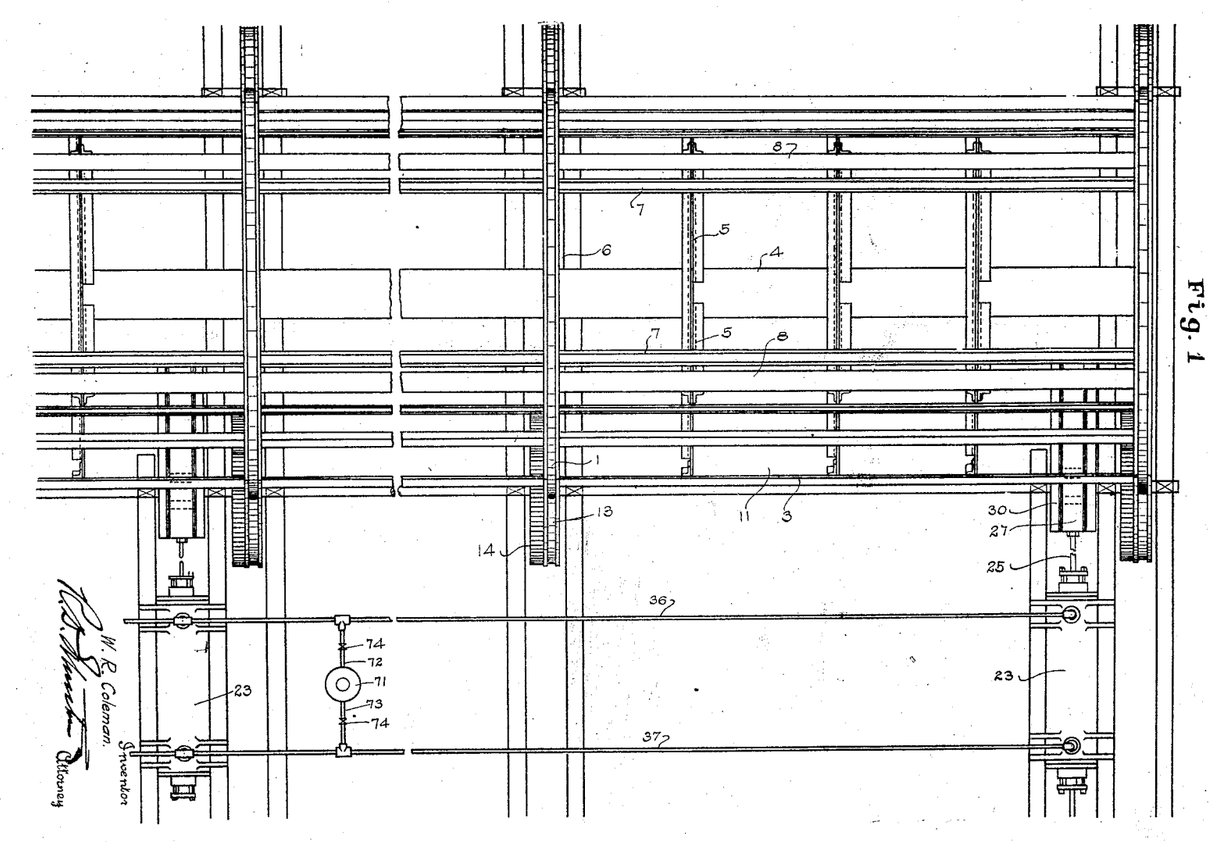
Fig. 1 shows in partial plan view a rotary dump equipped with my improved dash-pot control mechanism, the latch mechanism being omitted for the sake of clearness.
Figure 2:
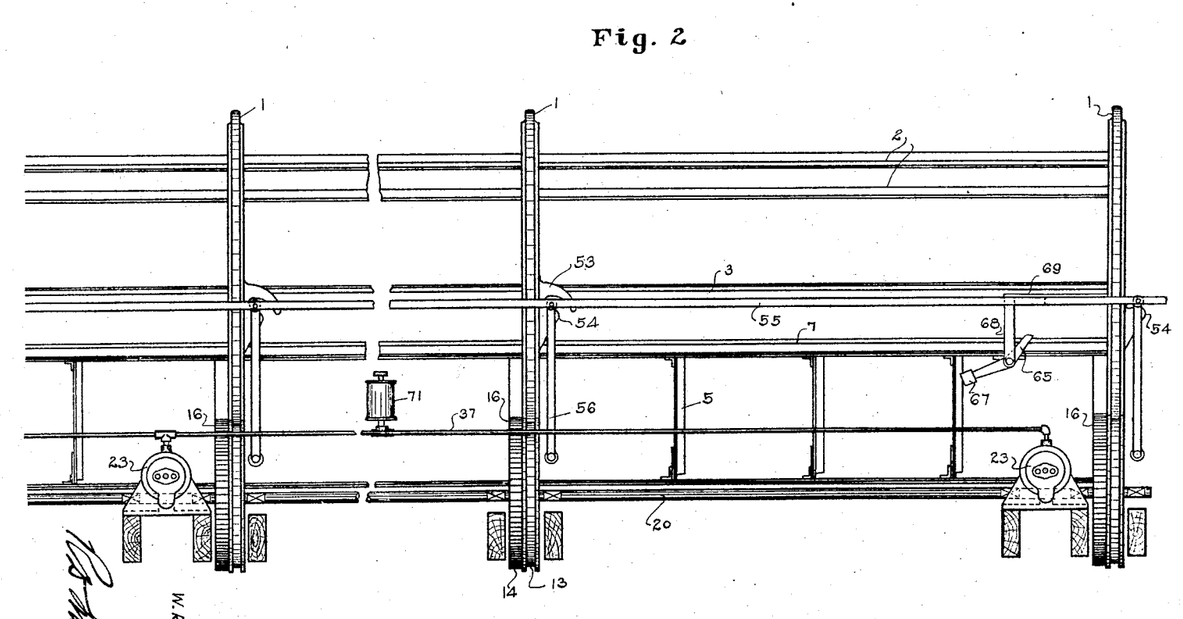
Fig. 2 is a side elevation of Fig. 1, showing the latch mechanism.
Figure 3:
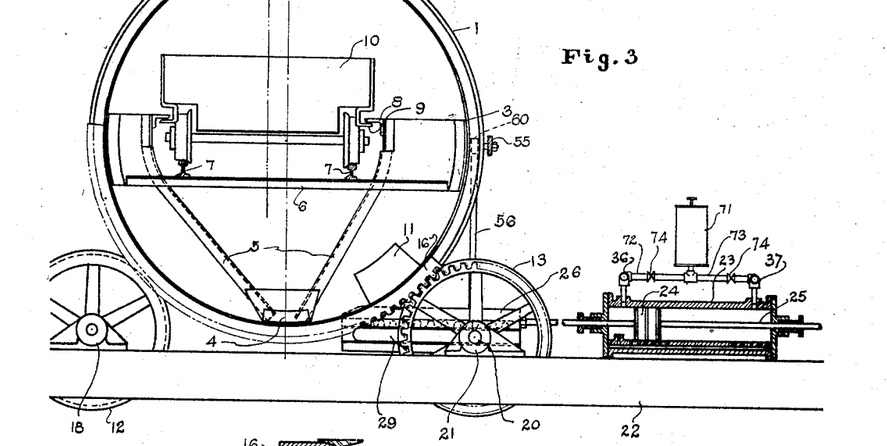
Fig. 3 is an end elevation of Fig. 2.

The main rails 7 are so disposed relatively to the mine car track that when the dump is upright the mine cars can be run into and out of the dump, and when the loaded cars are disposed in the dump and the same is unlatched, the unbalanced condition of the dump will cause it to rotate counter-clockwise as seen in Fig. 3 and to swing through an arc of from 130° to 150°, its unbalanced condition increasing as its rotation commences. After the car is dumped the wheels of the car will be above its center line and the dump will be again unbalanced on the opposite side and above its center so that it will tend to swing back reversely to initial position. This automatic operation involves certain inherent difficulties which arise from the variation in the loads of the cars being dumped, the variation in the number of cars in the dump, and the variation in the friction load of the dump, all of which make it necessary to so design the dump that it will perform its dumping operation and gather sufficient momentum with a minimum load to make sure that it will return to initial position. Such designing of the dump necessarily causes an excessive movement when fully or heavily loaded which presents very serious difficulties, particularly in connection with the stopping of the dump without undue shock or recoil at the end of its dumping swing or likewise, when the dump is counterweighted, at the end of its return swing to initial position. To overcome these difficulties, I have conceived of the provision of an automatic cushion stop means which will have a movement co-ordinated with that of the dump as it rotates and which can be so designed and adjusted as to apply the requisite resistance to the rotation of the dump to slow it up and stop it without recoil at the end of its forward or reverse rotation, and I desire to claim broadly any means adapted automatically to function in this manner. The means shown, and which are considered by me best adapted for the purposes in view, consist of one or more dashpots which comprise cylinders 23 having therein pistons 24 connected by piston rods 25 which extend through stuffing boxes at each end of the cylinder, the rod at its end adjacent to the dump being connected to a rack frame 26 having a rack 27 therein adapted to engage a pinion 28 fast on the trunnion shaft 20. The rack frame is formed by said plates having a longitudinal slot 29 therein in which the shaft 20 is received and which are braced above and below the shaft by longitudinal angle irons 30. The rack 27 is mounted by cross rivets between the upper portions of the plates and the rack, as thus described, is confined to a rectilinear line of travel and its movement is directly responsive and proportionate to the rotating movement of the dump since the latter is transmitted to the rack through the meshing rack gear 15 and gear 14. The pinion 28 however is of quite small diameter and I thus obtain the desired speed reduction which will, to the desired extent, reduce the length of the dash-pot cylinder.

Figures 5, 6:
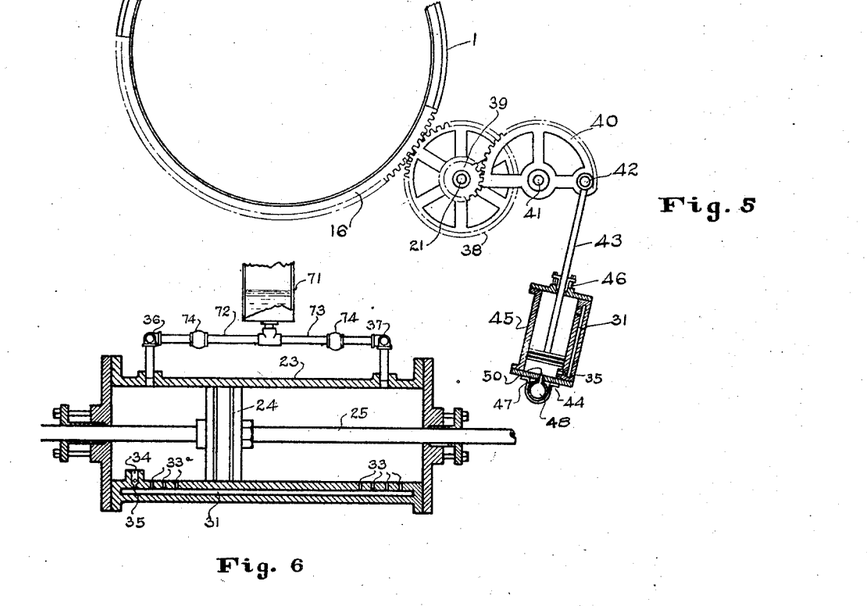
Fig. 5 is a view corresponding to Fig. 3 showing a modified type of dash-pot and drive therefor.
Fig. 6 is an enlarged detail cross-sectional view of the dash-pot shown in Fig. 3.
Figure 7:
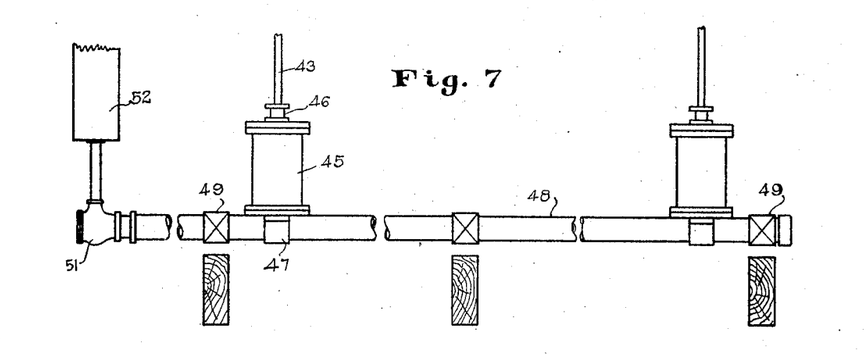
Fig. 7 is a view in elevation of a series of dash-pots as shown in Fig. 5 which are mounted on a common pressure equalizing pipe trunnion.
Figure 8:
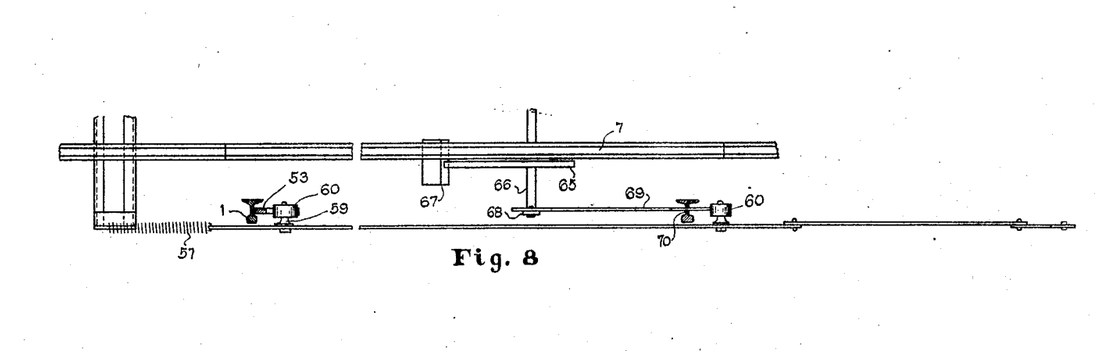
Figs. 8 and 9 are detail plan and side elevation views of a portion of the latch mechanism showing the combined automatic and manual control therefor.

I have illustrated sufficiently for the purposes of this application in Fig. 6 a dashpot mechanism comprising a by-pass 31 connecting the ends of the cylinder to by-pass the fluid from end to end of the cylinder. No claim is made in this application, to the dash pot per se, but only to its modified form as combined with and adapted to control a rotary dump. At each end the by-pass connects with a longitudinal series of ports 33 at one end and 33ª at the other. I also provide adjacent to one end of the cylinder an enlarged port 34 which receives a check valve 35 that opens inwardly towards the cylinder. The cross-sectional area of the ports 33 and their spacing axially of the cylinder must be determined empirically to give the piston, moving with the dump as it inverts the cars, a free intermediate movement until it commences to cover the ports, and as the piston moves to successively cover the ports they serve to gradually retardate it and to finally bring it to a positive stop free of any objectionable recoil. In like manner the ports 33ª must be designed and arranged to suitably retard and stop without recoil the return movement of the dump to initial position. The function of the ball check valve 35 is to automatically supplement the area of the ports 33 by that of the port 34, as the piston starts to the right on the initial dumping movement so as to insure it a free start and yet, as this valve closes when the piston starts back, it leaves only the ports 33ª to effect the cushioned stop of the dump. I find it necessary to release the dump quicker and more freely as it starts to dump so it will be sure to acquire sufficient momentum to carry it through its dumping stroke, as momentum must be relied on for this due to the fact that the cars empty themselves during the rotation of the dump and thereupon unbalance the dump so as to retard its further rotation. However, throughout the return stroke the counterbalance-weight 11 drives the dump and it does not need to acquire momentum to make sure of a full return stroke. Hence a check valve is not needed at the right hand end of the cylinder. This arrangement leaves the piston free to move rapidly and freely throughout its intermediate travel with all of the ports 33 and 33ª uncovered and to exert a gradually increasing retarding effect towards either end of its travel as it successively blanks off ports of either set, until it is brought to a positive stop at each end free of any recoil. In other words, co-relating the movements of the dash-pot to the dump, the dash-pot will leave free the initial and intermediate dumping movement and after stopping it will leave it free for a rapid return and will gradually slow it up as it blanks off the ports 33ª until it reaches its latching position, whereupon it is stopped positively and without jar or strain on the dump structure or the tipple.

Where an elongated dump is utilized, I provide each of the rings or so many of the rings as may be desirable, with a drive to its respective dash-pot, and in order that these dash-pots may all function with uniform effect lengthwise of the dump, it is necessary to equalize the pressures in the dash-potting cylinders and to this end I provide equalizing pipe lines 36 and 37 which extend over the inner and outer ends of the series of dash-pot cylinders and by branch pipes are connected into each end of each dash-pot cylinder. In this way the pressure at the working end of all the dash-pots will be equalized, whichever end it may be.

In Fig. 5 I show a modified transmission drive from the dump ring 1 through its rack 16 to a dash-pot. Here the rack 16 meshes a gear wheel 38 fast on the shaft 21 or like bearing and fast on this gear wheel 38 is a small gear wheel 39 which meshes a segmental gear 40 which is shown as a half gear mounted to rotate on a suitable shaft or bearing 41 and having a wrist pin 42 to which the rod 43 of the dash-pot piston 44 is swivelly connected. The dash-pot piston works in a cylinder 45 which has a stuffing box 46 at its upper end only, for the rod 43 and which at its lower end is suitably attached by a clamp or bracket 47 to a trunnion pipe 48, which pipe is mounted to turn in suitable bearings 49 and, where there are a number of dash-pots employed, each of their cylinders is preferably connected to this one pipe, and each has a port 50 communicating with the pipe which thus serves as a pressure equalizing conduit for the several dash-pots. These dash-pot cylinders are provided with any suitable type of by-pass such as shown in Fig. 6. That shown comprises the by-pass passage 31 and the series of ports 33 and 33ª and a check valve 35. The pipe 48 at its outer end, communicates past a check valve 51, with a reservoir or supply tank 52 which maintains the requisite volume of oil or other fluid in the dash-pot system. It will be noted that the axis of the trunnion pipe 48 is in the same vertical plane with the shaft 41 and that the dash-pot cylinder is rocked to the extreme on one side of its center when the dump is in initial position. As the dump commences to rotate the gear 40 moves counter-clockwise and the initial rectilinear movement of the piston is fast and free, gradually slowing down during the first 90° arc of travel of the gear 40. During the intermediate zone of its travel the piston has practically no movement, whereas during the final 45° arc of travel the piston has a rapidly increasing movement until the dash-pot is rocked to the other extreme and the dump has completed its angular movement in one direction. As the dump swings back to initial position the same piston movements are repeated. This arrangement is of special advantage in that it automatically relieves the dump of any appreciable dash-pot control except at the beginning and the end of its movement in each direction, and it is, as a general rule, only necessary to control the dump at the completion of its rotating movement in either or both directions. The single check valve here allows equally free initial movement in both directions.

Figure 9:
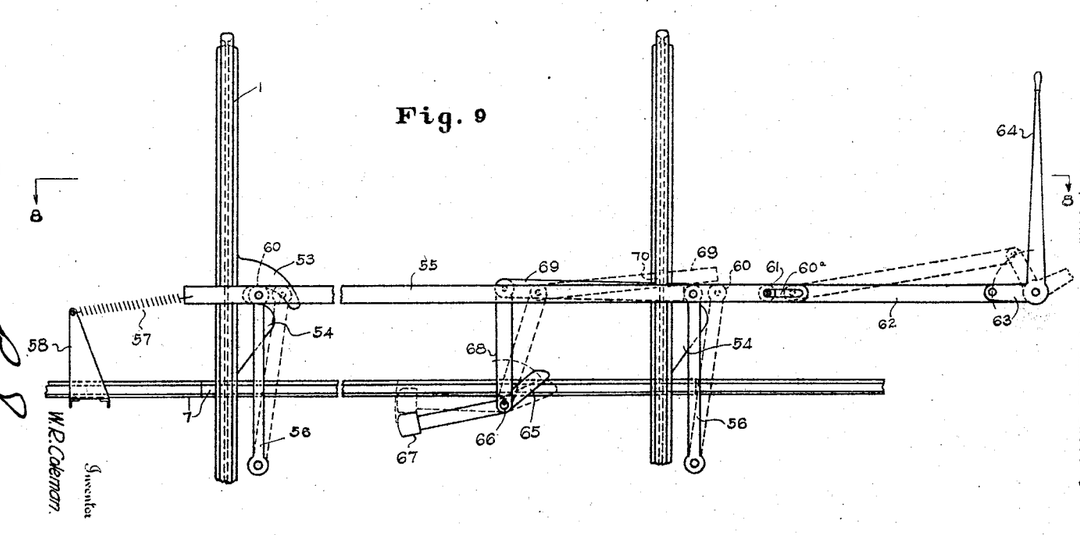

The mechanism for latching and unlatching the dump comprises a series of horns or hook-like stop members 53 which are rigidly attached on the side of all of the riding rings except one end ring. Each of these stop members comprises a shoulder 54 which is overhung by the horn and which is more clearly shown in Fig. 9, which illustrates the two end riding rings of the dump. A latch bar 55 extends the length of the dump being supported at intervals by the rocking bars 56 pivotally mounted on the tipple structure. The latch bar at one end is engaged by a coil spring 57 connected to a suitable anchor and which serves to yieldingly draw the bar towards the left (Fig. 9). The bar is provided opposite each riding ring with a boss 59 carrying a roller 60 which is adapted to engage the latch elements 53, 54, and which is normally drawn into position between them as shown in full lines, Fig. 9. At its right hand end the latch bar is provided with an elongated slot 60$^a$, which slot receives a pin 61 secured to the end of a bar 62 which is operable by a bell crank 63 of a hand lever 64 which is pivoted on any suitable support on the tipple. The object of the elongated slot is to permit the bar 55 to be operated automatically by the car track mechanism which comprises a trip member 65 pivoted on bearing 66 below the track and adapted to be engaged and depressed by a car wheel against the action of a counterweight 67. Rigid with the trip bar 65 is an arm 68 which extends upwardly and is pivotally connected to a trip arm 69. This trip arm passes through a slot 70 in the adjacent end riding ring 1, which slot is elongated circumferentially of the ring so that the trip arm 69 can rise to its dotted position in Fig. 9. The outer end of the trip bar 69 normally rests in the slot in line with the top of the shoulder 54 and in position when thrust outwardly to engage a roller 60 on the end latch bar 56 and force the bar 55 towards the right, causing all of the rollers 60 to be simultaneously disengaged from the several shoulders 54 so that the dump is free to respond to its unbalanced condition and to rotate counter-clockwise. The thrust of the several rollers, as they are thrown to the right, engages the curved underface of the horns 53 and tends to positively start the dump on its rotation. As the car will remain in position depressing the trip 65, the latch bar 69 will remain in position overhanging beyond the end of the adjacent shoulder 54 until the dump completes its rotation when it will engage the adjacent roller 60 and be lifted thereby to its dotted position (Fig. 9) when it forms a stop corresponding to the horns 53 for the other rings of the dump. This automatic operation of the latch bar due to the slot 60 can be carried on without disturbing the hand lever 64 and in like manner the hand lever can be utilized to operate the dump latches independently of the car trip 65.

In the general operation of the dump, the loaded cars to be dumped are run into the dump on the tracks 7 until the front car strikes the car trip 65, whereupon the trip is actuated, the trip bar 69 is thrust to the right and the latch bar 55 is shifted to disengage simultaneously all of the latches, thereby releasing the dump for its automatic roatation. As the dump starts forward the racks 16 on the several riding rings will be meshing the gear wheels 13 or 38 and will move all of the dash-pot pistons simultaneously and these pistons, subject to the regulation of the dash-pots, will not interfere with the free initial rotation of the dump but will form cushion stops for it of such character as to enable it to operate without jars or recoils which would rack the dump or tipple.

While I have referred, for the sake of brevity, to my stop means as a dash-pot I mean, by that term, to include any means which is adapted to utilize a body of liquid for the purpose of arresting the movement of an element driven by the dump, and it is to be understood that I am able to prevent a recoil by the provision of any means of escape for the trapped liquid which has its cross-sectional area gradually decreased as said movable element approaches the terminus of its travel in either or both directions. It is this graduated decrease in the avenue of escape for the trapped body of incompressible liquid which exerts a gradually retarded escape free of recoil on the dump.

In order to maintain the entire dash-potting system, including the cylinders and pressure equalizing pipes 36 and 37, entirely full of oil and to withdraw therefrom any air that might collect in the system, I provide a main liquid supply tank 71 and by branch pipes 72 and 73 I connect this tank with the equalizing pipes 36 and 37, respectively. A check valve 74 is provided in each of the pipes 72 and 73 and is disposed to be seated by the dash-pot pressure. The result of this is that when the system is not entirely full of liquid the check valve will open admitting the requisite volume of liquid to fill the system and withdrawing the air that had entered the system. As a result of this arrangement the air representing a compressible and elastic element is continuously excluded from the system.

Having thus described my invention, what I claim as new and desire to secure by Letters Patent, is:—

1. The combination with a dump having means to receive and hold a car and a fixed axis about which the dump turns to discharge the contents of the car, of a dash-pot, and a speed reducing transmission actuated by the periphery of the dump and direct connected to the movable element of the dash-pot to control the dump's angular movements in both directions.

2. The combination with a dump adapted to rotate about its long axis, of a peripheral toothed element on the dump, a dash-pot, a positive operating connection between the dump and dash-pot comprising a toothed gear meshing the toothed element on the dump and having operating connections with the movable element of the dash-pot.

3. The combination with a dump adapted to rotate about its long axis, of a toothed gear segment mounted on the periphery of the dump, a toothed gear wheel adapted to mesh said segment, a dash-pot, and a speed reducing rack and pinion drive connecting the gear wheel and movable element of the dash-pot.

4. The combination with a dump adapted to rotate about its long axis and having riding rings provided with gear teeth, of speed reducing gear transmission means driven by each ring gear teeth, and a dash-pot having its movable element operated by each transmission.

5. The combination with a dump adapted to rotate about its long axis and having riding rings provided with gear teeth, of transmission means driven by the ring gear teeth, and a dash-pot having its movable element operated by such transmission.

6. The combination with a dump adapted to rotate about its long axis, of a peripheral gear element on the dump, a dash-pot, and a positive transmission for driving the movable element of the dash-pot from said peripheral gear on the dump.

7. The combination with an elongated dumping structure adapted to receive and dump a train of cars, of a series of dash-pots, means to equalize the pressures in the dash-pots, and means to drive the movable elements of the several dash-pots by the dumping structure.

8. The combination with an elongated dump adapted to rotate about an axis lengthwise thereof, of a series of dash-pots, means to drive the movable element of the several dash-pots simultaneously by the dump, and means to equalize the controlling function of the several dash-pots.

9. The combination with an elongated dump adapted to rotate about its long axis, of a control means comprising a series of inter-connected fluid cylinders, and movable elements therein which are severally operable by mechanisms connected to the dump at intervals lengthwise thereof.

10. The combination with an elongated dump adapted to receive and dump at one time a plurality of cars, of a mechanism for controlling the angular movement of the dump comprising a plurality of dash-pots operatively connected to the dump and having means to equalize their resistance to the dump's movement.

11. The combination with an elongated dump adapted to receive and dump at one time a plurality of cars, of a mechanism for controlling the angular movement of the dump comprising a plurality of dash-pots operatively connected to the dump and having inter-connecting pressure equalizing means to equalize their resistance to the dump's movement.

12. The combination with an elongated dump adapted to receive and dump at one time a plurality of cars, of a mechanism for controlling the angular movement of the dump comprising a plurality of dash-pots operatively connected to the dump and having means to equalize their resistance to the dump's movement comprising a fluid pressure equalizing pipe connecting corresponding ends of the dash-pots.

13. The combination with an elongated dump adapted to receive and dump at one time a plurality of cars, of a mechanism for controlling the angular movement of the dump comprising a plurality of dash-pots operatively connected to the dump and having means to equalize their resistance to the dump's movements in both directions comprising two fluid pressure equalizing pipes each connecting corresponding ends of the dash-pots.

14. In a dump rotatable about its long axis, latch means comprising a stop on the dump, a latch having a stationary support and movable to engage and release the stop, and independently operative car controlled and manually controlled instrumentalities to operate said latches.

15. In a dump rotatable about its long axis, latch means comprising a stop on the dump, a latch having a stationary support and movable to engage and release the stop, independently operative car controlled and manually controlled instrumentalities to operate said latches, and spring means to force the latch normally towards position to engage the stop on the dump.

16. In a rotary dump adapted to rotate about its long axis, a car receiving track in the dump, stops on the dump, latch members adapted to engage the stops and hold the dump in initial position, a car actuated trip means adapted to disengage the latches, and manual means to disengage the latches having a lost-motion connection therewith to permit free operation of the latches by the car trip.

17. In a rotary dump having a track and means to unbalance the dump for automatic operation, latch means for the dump comprising a plurality of stops on the dump, a plurality of latches adapted to engage said stops and hold the dump in initial position, and car actuated means adapted to automatically and positively disengage the several latches simultaneously.

18. In a rotary dump having a track and means to unbalance the dump for automatic operation, latch means for the dump comprising a plurality of stops on the dump, a plurality of latches adapted to engage said stops and hold the dump in initial position, and car actuated means adapted to automatically and positively disengage the several latches simultaneously, each stop comprising a shoulder which engages the latch to hold the unbalanced dump in initial position, and a curved horn overhanging the shoulder and adapted to engage the latches in open position and both arrest the return movement of the dump and shift the latch into position to engage the shoulder.

19. In a rotary dump having a car receiving track, latch means for the dump comprising a plurality of stops on the dump, a plurality of stop engaging latches, a latch bar connecting the several latches for joint movement, means acting on said bar to urge the latches towards engaged position, and a car actuated trip means adapted to engage a latch and move all simultaneously to disengaged position.

20. In a rotary dump having a car receiving track, latch means for the dump comprising a plurality of stops on the dump, a plurality of stop engaging latches, a latch bar connecting the several latches for joint movement, means acting on said bar to urge the latches towards engaged position, and a car actuated trip means adapted to engage a latch and move all simultaneously to disengaged position, said car actuated trip means comprising an element movable by a car wheel, a trip bar movable by said element lengthwise of the dump, and a guide for said bar elongated circumferentially of the dump and disposed in position to guide the trip against a latch to disengage it.

21. In a rotary dump having a car receiving track, latch means for the dump comprising a plurality of stops on the dump, a plurality of stop engaging latches, a latch bar connecting the several latches for joint movement, means acting on said bar to urge the latches towards engaged position, and a car actuated trip means adapted to engage a latch and move all simultaneously to disengaged position, said car actuated trip means comprising an element movable by a car wheel, a trip bar movable by said element lengthwise of the dump, and a guide for said bar elongated circumferentially of the dump and disposed in position to guide the trip against a latch to disengage it, said trip being adapted during the rotation of the dump to overhang the adjacent stop and to engage the adjacent latch as a stop means to arrest the return movement of the dump to initial position.

22. The combination with a movable dumping structure, of cushioning means to stop the structure free of objectionable recoil, comprising a fluid containing cylinder, a piston movable therein responsive to the movements of the structure, and means corelated with the cylinder to cause the fluid therein to substantially retard the piston's travel in a given direction only as it approaches the terminal zone of its travel.

23. The combination with a movable dumping structure, of cushioning means to stop the structure free of objectionable recoil, comprising a fluid containing cylinder, a piston movable therein responsive to the movements of the structure, and means corelated with the cylinder to cause the fluid therein to substantially retard the pistons travel in a given direction only as it approaches the terminal zone of its travel, said means comprising by-pass ports designed and adapted to effect a gradual increase of fluid resistance to the pistons movement throughout such terminal zone.

24. The combination with a movable dumping structure, of a cushioning means to stop the structure free of objectionable recoil, said means comprising a fluid containing cylinder having a piston therein movable with the structure, and a longitudinal series of by-pass ports located in and connecting the ends only of the cylinder, said ports being designed and arranged to by-pass the fluid without appreciable resistance to the piston throughout all but the terminal zone of its travel in either direction.

25. The combination with a dump movable about an axis, of a control means for the dump having a movable element operably connected to and driven by said dump, and means to utilize a body of fluid to retard said movable element only as the dump approaches the end of its angular movement in either direction.

26. The combination with a movable car dump, of a cushion means to stop the dump without recoil, comprising a body of liquid, and relatively movable elements between which the liquid is adapted to be trapped only during the terminal zone of the dump's movement in a given direction, there being an avenue of escape for the trapped fluid arranged and designed to have its area gradually decreased as said elements approach during said terminal zone of the dump's movement.

27. The combination with a movable car dump, of a cushion means to stop the dump without recoil, comprising a body of liquid, and relatively movable elements between which the liquid is adapted to be trapped, there being an avenue of escape for the trapped fluid arranged and designed to have its area gradually decreased as said elements approach during a terminal zone of the dump's movement.

In testimony whereof I affix my signature.

WILLIAM R. COLEMAN.